US008645602B2

(12) United States Patent
Ishikawa

(10) Patent No.: US 8,645,602 B2
(45) Date of Patent: Feb. 4, 2014

(54) MICROCOMPUTER

(75) Inventor: Naoshi Ishikawa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 181 days.

(21) Appl. No.: 13/179,119

(22) Filed: Jul. 8, 2011

(65) Prior Publication Data

US 2012/0030389 A1    Feb. 2, 2012

(30) Foreign Application Priority Data

Jul. 29, 2010  (JP) ................. 2010-170664

(51) Int. Cl.
*G06F 13/00* (2006.01)
*H04L 27/00* (2006.01)

(52) U.S. Cl.
USPC .......................... 710/110; 374/325

(58) Field of Classification Search
USPC ........................... 710/110; 395/325
See application file for complete search history.

(56) References Cited

U.S. PATENT DOCUMENTS

| | | | | |
|---|---|---|---|---|
| 5,263,172 | A * | 11/1993 | Olnowich | 710/307 |
| 5,537,660 | A * | 7/1996 | Bond et al. | 710/58 |
| 5,758,133 | A * | 5/1998 | Evoy | 713/501 |
| 5,778,218 | A * | 7/1998 | Gulick | 713/503 |
| 5,918,073 | A * | 6/1999 | Hewitt | 710/52 |
| 6,097,738 | A * | 8/2000 | Talaat et al. | 370/492 |
| 6,701,399 | B1 * | 3/2004 | Brown | 710/114 |
| 6,772,254 | B2 * | 8/2004 | Hofmann et al. | 710/110 |
| 7,000,140 | B2 * | 2/2006 | Okubo et al. | 713/601 |
| 7,254,657 | B1 * | 8/2007 | Lanfield et al. | 710/105 |
| 7,398,414 | B2 * | 7/2008 | Sherburne, Jr. | 713/600 |
| 7,725,638 | B2 * | 5/2010 | Zhang et al. | 710/301 |
| 8,041,867 | B2 * | 10/2011 | Lin | 710/110 |
| 8,225,021 | B2 * | 7/2012 | Adkins et al. | 710/110 |
| 8,238,376 | B2 * | 8/2012 | Iwamura | 370/503 |
| 2005/0065619 | A1 * | 3/2005 | Kim et al. | 700/3 |
| 2005/0080942 | A1 * | 4/2005 | Ogilvie et al. | 710/22 |
| 2005/0193256 | A1 * | 9/2005 | Moyer | 714/30 |
| 2005/0240697 | A1 * | 10/2005 | Liao et al. | 710/110 |
| 2006/0112205 | A1 * | 5/2006 | Chang et al. | 710/110 |
| 2006/0155893 | A1 * | 7/2006 | Bottemiller et al. | 710/27 |
| 2006/0190649 | A1 * | 8/2006 | Ganasan | 710/113 |

FOREIGN PATENT DOCUMENTS

JP   2002-163032   6/2002
JP   2009-169539   7/2009

* cited by examiner

*Primary Examiner* — Paul R Myers
*Assistant Examiner* — Christopher A Daley
(74) *Attorney, Agent, or Firm* — McDermott Will & Emery LLP

(57) ABSTRACT

Disclosed is a microcomputer that can gain bus access irrespective of the magnitude relationship between the frequency of a bus master and the frequency of a bus slave. A CPU operates in accordance a first clock, which has a variable frequency. A timer operates in accordance with a second clock. A frequency conversion logic circuit is coupled to the CPU through a main bus and coupled to the timer through a peripheral I/O bus. When the first clock is higher in frequency than the second clock, the frequency conversion logic circuit generates a bus control signal for the timer by using a first synchronization signal, which indicates the change timing of a bus control signal for the peripheral I/O bus. When the first clock is lower in frequency than the second clock, the frequency conversion logic circuit generates a bus control signal for the CPU by using a second synchronization signal, which indicates the change timing of a bus control signal for the main bus. Therefore, bus access can be gained irrespective of the magnitude relationship between the frequencies of the CPU and timer.

4 Claims, 11 Drawing Sheets

MICROCOMPUTER

CROSS-REFERENCE TO RELATED APPLICATIONS

The disclosure of Japanese Patent Application No. 2010-170664 filed on Jul. 29, 2010 including the specification, drawings, and abstract is incorporated herein by reference in its entirety.

BACKGROUND

The present invention relates to a technology for allowing a CPU (central processing unit) or other bus master to access a peripheral I/O device or other bus slave coupled to a bus. More specifically, the present invention relates to a microcomputer that provides control to let a bus master access a bus slave in an efficient manner.

In recent years, semiconductor integrated circuits are integrated to an increasingly high degree so that plural bus masters, such as CPUs, and plural bus slaves, such as peripheral I/O devices, are now integrated into a single semiconductor chip. In such semiconductor devices, the bus slaves, such as peripheral I/O devices and external buses, operate at frequencies lower than operating frequencies of the bus masters so that the communication between the bus masters and bus slaves is generally established by performing clock domain conversion with a synchronization signal.

Further, when a bus master writes data to a bus slave coupled to a bus, a write buffer can be used to improve cycle performance.

Furthermore, if, in a system where plural bus masters access a bus slave through a bus, there is a conflict between bus access requests from the bus masters, arbitration is generally performed in accordance with a predetermined order of priority. Technologies related to the above arbitration are described by inventions disclosed, for instance, in Japanese Unexamined Patent Publications No. 2009-169539 and 2002-163032.

The invention disclosed in Japanese Unexamined Patent Publication No. 2009-169539 provides a microcomputer that is capable of establishing serial communication even in a sleep mode. The invention includes a serial communication unit. In addition to a main clock that is generated in a normal operation mode of a CPU, the serial communication unit generates a subclock in a sleep mode in which the power consumption is smaller than in the normal operation mode, operates in accordance with the subclock in the sleep mode, and establishes serial communication with a peripheral circuit. The invention also includes a wake-up factor identification unit and a wake-up signal output unit. The wake-up factor identification unit judges, in accordance with received data, whether a wake-up factor is generated. The wake-up factor demands a wake-up process for switching an operation mode from the sleep mode to the normal operation mode. The wake-up signal output unit outputs a wake-up signal to an operation mode switching unit when it is judged that the wake-up factor is generated. The wake-up signal switches the operation mode from the sleep mode to the normal operation mode.

The invention disclosed in Japanese Unexamined Patent Publication No. 2002-163032 provides a data processor that not only permits a quick transition from a low power consumption state to an operating state, but also assures low power consumption. The data processor has a standby mode, a write standby mode, and a sleep mode. In the sleep mode, the supply of a synchronization clock signal to a CPU shuts off so that the synchronization clock signal is supplied to the other circuit modules. In the standby mode, the multiplication and frequency division operations of a clock pulse generator are stopped with the synchronization clock signal supply to the other circuit modules shut off. In the write standby mode, the multiplication and frequency division operations of the clock pulse generator are enabled with the synchronization clock signal supply to the CPU and other circuit modules shut off. The write standby mode allows the CPU to switch into a command execution state more quickly than the standby mode and consumes less power than the sleep mode.

SUMMARY

As described above, the communication between a bus master and a bus slave is established by performing clock domain conversion with a synchronization signal. However, when a peripheral I/O device or external bus is to be operated at a high speed without regard to the frequency of the bus master, it is necessary that the frequency of the bus slave be lower than the frequency of the bus master. Therefore, the combination of the frequencies of the bus master and bus slave cannot be freely set up.

Further, when the access order of bus slaves coupled to different buses is to be guaranteed between a write access and the immediately following access during the use of a write buffer, it is necessary, for instance, to perform, after the first write access, a dummy read of a bus slave that is involved in the first write access. This results in a decrease in cycle performance.

Furthermore, even when an interrupt or like event occurs or DMA transfer is to be performed between bus slaves requiring substantially no cycle performance in a situation where arbitration is performed in accordance with a predetermined order of priority when there is a conflict between bus access requests from plural bus masters, flexible bus arbitration cannot be performed in accordance with the circumstances.

The present invention has been made to address the above problems, and provides a microcomputer that can gain bus access irrespective of the magnitude relationship between the frequency of a bus master and the frequency of a bus slave.

According to an embodiment of the present invention, there is provided a microcomputer that includes a CPU and a timer. The CPU operates in accordance with clock 1, which has a variable frequency. The timer operates in accordance with clock 2. A bus controller is coupled to the CPU through a main bus and coupled to the timer through a peripheral I/O bus. When the frequency of clock 1 is higher than the frequency of clock 2, a bus control signal for the timer is generated by using synchronization signal 1, which indicates the change timing of a bus control signal for the peripheral I/O bus. When, on the other hand, the frequency of clock 1 is lower than the frequency of clock 2, a bus control signal for the CPU is generated by using synchronization signal 2, which indicates the change timing of a bus control signal for the main bus.

According to an embodiment of the present invention, when the frequency of clock 1 is lower than the frequency of clock 2, the bus control signal for the CPU is generated by using synchronization signal 2, which indicates the change timing of the bus control signal for the main bus. Therefore, bus access can be gained irrespective of the magnitude relationship between the frequency of the CPU and the frequency of the timer.

BRIEF DESCRIPTION OF THE DRAWINGS

Embodiments of the present invention will be described in detail based on the following figures, in which.

DETAILED DESCRIPTION

First Embodiment

Figure 1:
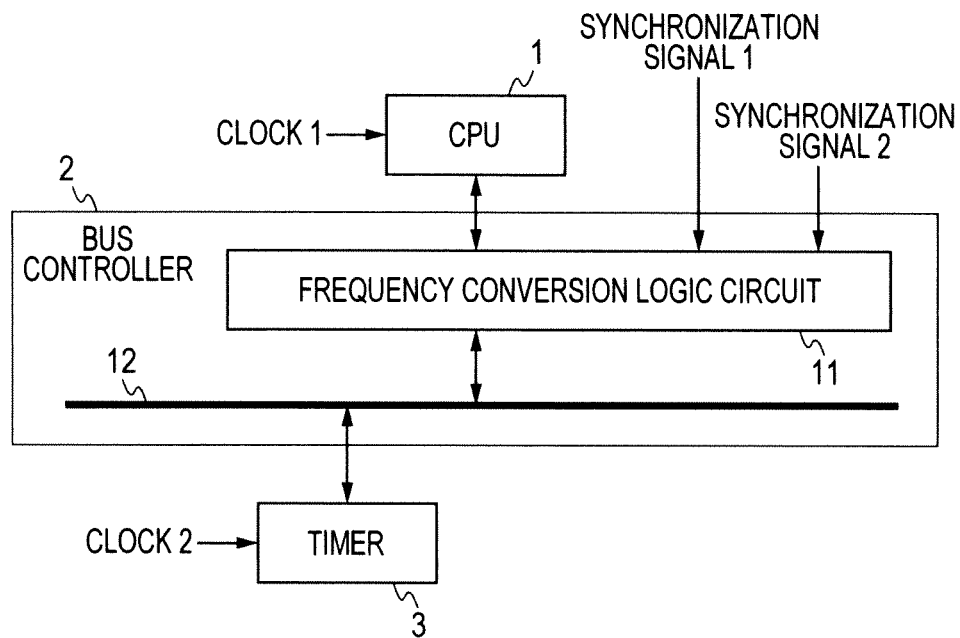
FIG. 1 is a block diagram illustrating a schematic configuration of a microcomputer according to a first embodiment of the present invention.

FIG. 1 is a block diagram illustrating a schematic configuration of a microcomputer according to a first embodiment of the present invention. The microcomputer includes a CPU 1, which is a bus master; a bus controller 2; and a timer 3, which is an example of a bus slave (peripheral I/O device).

The CPU 1 operates in accordance with clock 1, which has a variable frequency. The timer 3 operates in accordance with clock 2, which differs from clock 1 in frequency. When the CPU 1 accesses the timer 3, a bus control signal needs to be frequency-converted.

The bus controller 2 includes a frequency conversion logic circuit 11, which is coupled to the CPU 1 and coupled to the timer 3 through a bus 12. When the frequency of clock 1 is higher than the frequency of clock 2, the frequency conversion logic circuit 11 frequency-converts the bus control signal with synchronization signal 1. When, on the other hand, the frequency of clock 1 is lower than the frequency of clock 2, the frequency conversion logic circuit 11 frequency-converts the bus control signal with synchronization signal 2.

Figure 2:
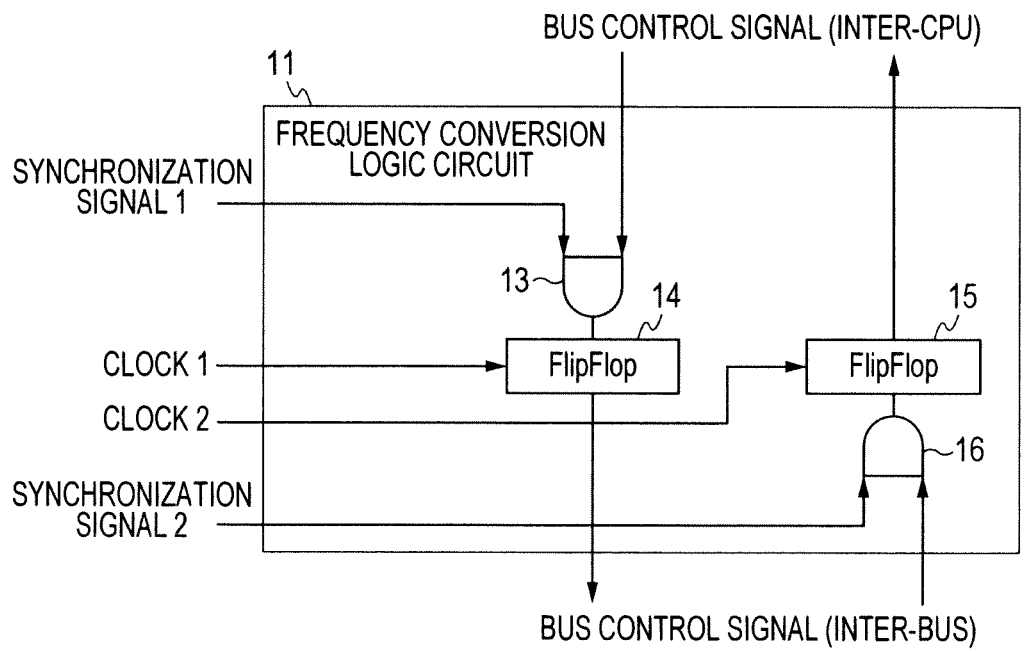
FIG. 2 is a diagram illustrating in detail a frequency conversion logic circuit 11.

FIG. 2 is a diagram illustrating in detail the frequency conversion logic circuit 11. The frequency conversion logic circuit 11 includes AND circuits 13, 16 and flip-flops (hereinafter also referred to as the FFs) 14, 15.

As described later, when the frequency of clock 1 is higher than the frequency of clock 2, a pulse is output to synchronization signal 1 so that synchronization signal 2 is maintained at a high level (hereinafter referred to as the H level). Therefore, when synchronization signal 1 is at the H level, the AND circuit 13 outputs a bus control signal value to the FF 14. Then, at the next cycle (at the rise of clock 1), the FF 14 maintains the bus control signal value. Synchronization signal 1 indicates the change timing of a bus control signal for the peripheral I/O bus.

When, on the other hand, the frequency of clock 1 is lower than the frequency of clock 2, synchronization signal 1 is maintained at the H level so that a pulse is output to synchronization signal 2. When synchronization signal 2 is at the H level, the AND circuit 16 outputs a bus control signal value to the FF 15. Then, at the next cycle (at the rise of clock 2), the FF 15 maintains the bus control signal value. Synchronization signal 2 indicates the change timing of a bus control signal for a main bus.

Figure 3:
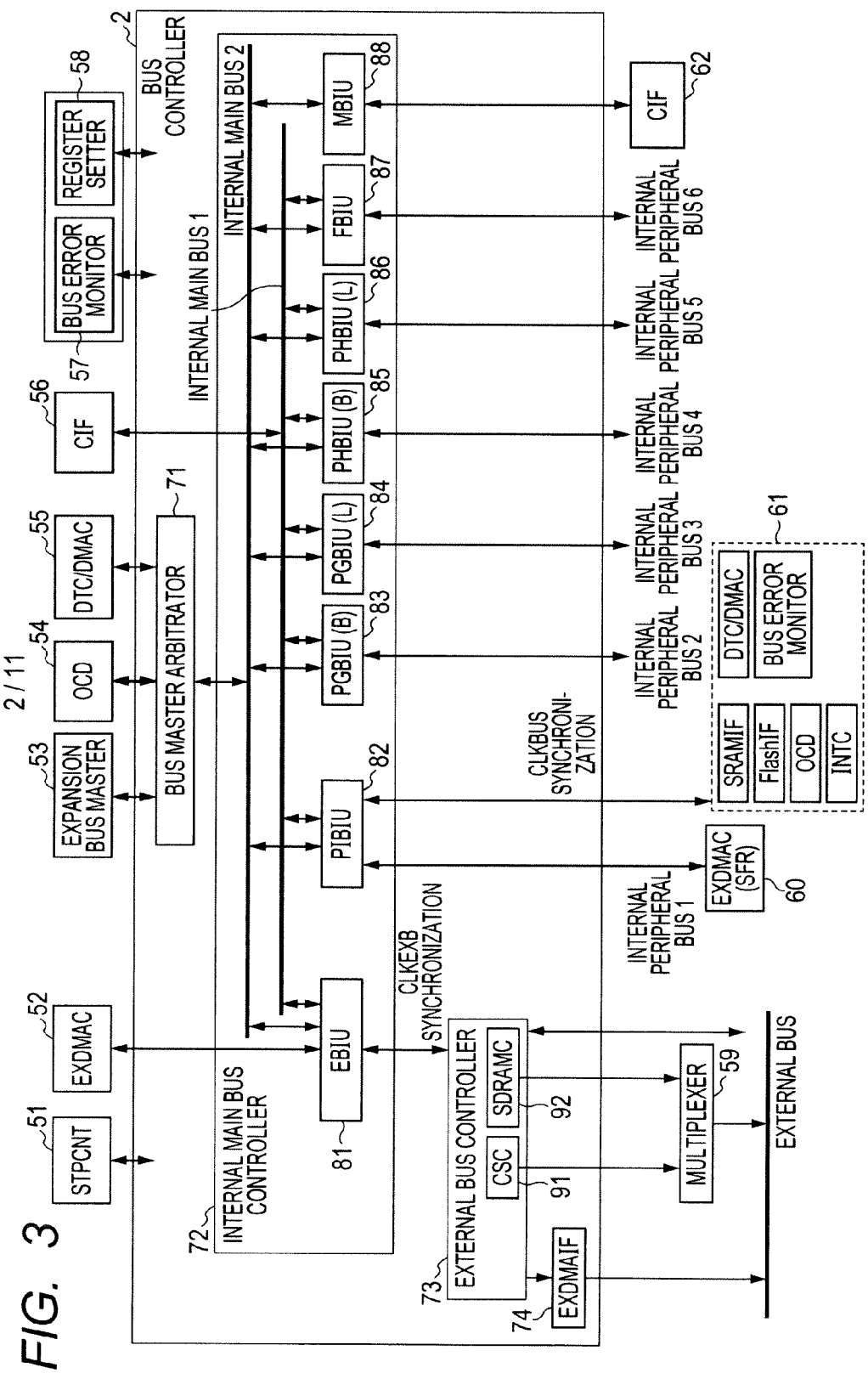
FIG. 3 is a diagram illustrating a detailed configuration of the microcomputer according to the first embodiment of the present invention.

FIG. 3 is a diagram illustrating a detailed configuration of the microcomputer according to the first embodiment of the present invention. The microcomputer includes the bus controller 2, an STPCNT 51, an EXDMAC (external direct memory access controller) 52, an expansion bus master 53, an OCD (on-chip debugger) 54, a DTC (data transfer controller)/DMAC 55, a CIF (CPU interface) 56, a bus error monitor 57, a register setter 58, a multiplexer 59, an EXDMAC (SFR) 60, functional blocks 61, and a CIF 62.

The bus controller 2 includes a bus master arbitrator 71, an internal main bus controller 72, an external bus controller 73, and an EXDMAIF 74. The external bus controller 73 includes a CSC (chip select controller) 91 and an SDRAMC (synchronous dynamic random access memory controller) 92.

The internal main bus controller 72 includes an EBIU (external bus interface unit) 81, a PIBIU (peripheral internal BIU) 82, a big-endian PGBIU (peripheral general BIU) 83, a little-endian PGBIU 84, a big-endian PHBIU (peripheral high-speed BIU) 85, a little-endian PHBIU 86, an FBIU (flash BIU) 87, and an MBIU (memory BIU) 88. These components are coupled to both internal main bus 1 and internal main bus 2.

The CPU 1 shown in FIG. 1 is coupled to internal main bus 1 through the CIF 56. The CPU 1 accesses a bus slave such as a peripheral I/O device or an external bus through the BIUs 81 to 88. For example, the CPU 1 accesses an external bus through the EBIU 81, the external bus controller 73, and the multiplexer 59.

Further, the CPU 1 accesses through the PIBIU 82 the EXDMAC 60 and functional blocks 61, which are coupled to internal peripheral bus 1. The CPU 1 also accesses through the PGBIU 83 a peripheral I/O device coupled to internal peripheral bus 2.

The bus master arbitrator 71 is coupled between internal main bus 2 and the expansion bus master 53, OCD 54, and DTC/DMAC 55, which are bus masters, to arbitrate the access of the bus masters 53 to 55 to internal main bus 2.

The other components shown in FIG. 3 will not be described in detail because they are not particularly relevant to the present invention.

Figure 4:
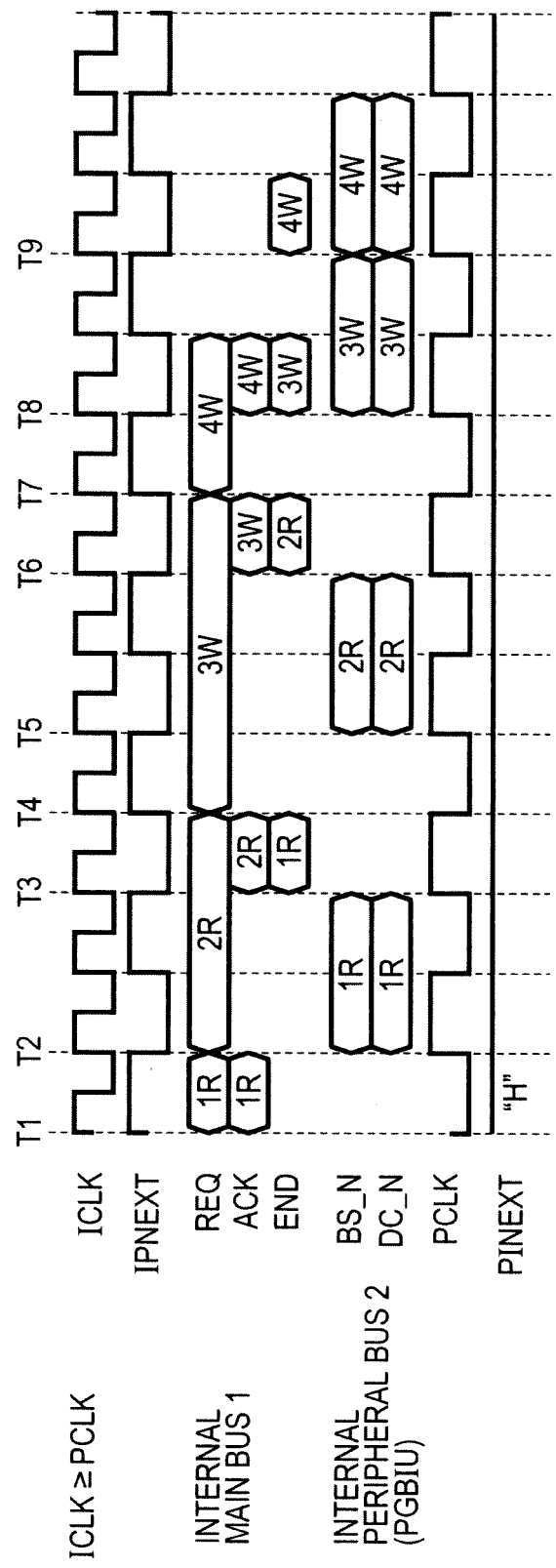
FIG. 4 is a timing diagram illustrating an operation of the microcomputer according to the first embodiment of the present invention.

FIG. 4 is a timing diagram illustrating an operation of the microcomputer according to the first embodiment of the present invention. This timing diagram assumes that the CPU 1 accesses the timer 3 and other peripheral I/O devices that are coupled to internal peripheral bus 2 through the PGBIU 83, and that the frequency of an ICLK (clock 1) is higher than the frequency of a PCLK (clock 2).

In FIG. 4, an IPNEXT signal corresponds to synchronization signal 1, which is shown in FIGS. 1 and 2, and PINEXT signal corresponds to synchronization signal 2, which is also shown in FIGS. 1 and 2. The symbols "1R" and "2R" represent read cycles relative to internal peripheral bus 2, whereas the symbols "3W" and "4W" represent write cycles relative to internal peripheral bus 2.

First of all, when, at time T1, the CPU 1 outputs a bus access request (REQ) signal for a first read access (1R) to internal main bus 1, the PGBIU 83 returns a bus access acknowledgment (ACK) signal to the CPU 1.

At time T2, the PGBIU 83 receives a REQ from the CPU 1 at the next cycle at which the IPNEXT signal is at the H level, and outputs a bus access start (BS_N) signal to internal peripheral bus 2 (timer 3). At this time, the PGBIU 83 receives a bus access end (DC_N) signal from internal peripheral bus 2. Further, the CPU 1 outputs a REQ signal for a second read access (2R) to internal main bus 1.

At time T3, the PGBIU 83 outputs a bus access end (END) signal to the CPU 1 and returns an ACK signal for the second read access (2R) to the CPU 1.

At time T4, the CPU 1 outputs a REQ signal for a third write access (3W) to internal main bus 1.

At time T5, the PGBIU 83 receives a REQ (2R) from the CPU 1 at the next cycle at which the IPNEXT signal is at the H level, and outputs a BS_N signal to internal peripheral bus 2. At this time, the PGBIU 83 receives a DC_N signal from internal peripheral bus 2.

At time T6, the PGBIU 83 outputs an END signal (2R) to the CPU 1 and returns an ACK signal for the third write access (3W) to the CPU 1.

At time T7, the CPU 1 outputs a REQ signal for a fourth write access (4W) to internal main bus 1.

At time T8, the PGBIU 83 outputs an END signal (3W) to the CPU 1 and returns an ACK signal for the fourth write access (4W) to the CPU 1. Further, the PGBIU 83 receives a REQ (3W) from the CPU 1 at the next cycle at which the IPNEXT signal is at the H level, and outputs a BS_N signal to internal peripheral bus 2. At this time, the PGBIU 83 receives a DC_N signal from internal peripheral bus 2.

As described above, when the frequency of the ICLK (clock 1) is higher than the frequency of the PCLK (clock 2), the PGBIU 83 uses the frequency conversion logic circuit 11 shown in FIG. 2 to generate a BS_N signal at the next cycle at which the IPNEXT signal is at the H level.

Figure 5:
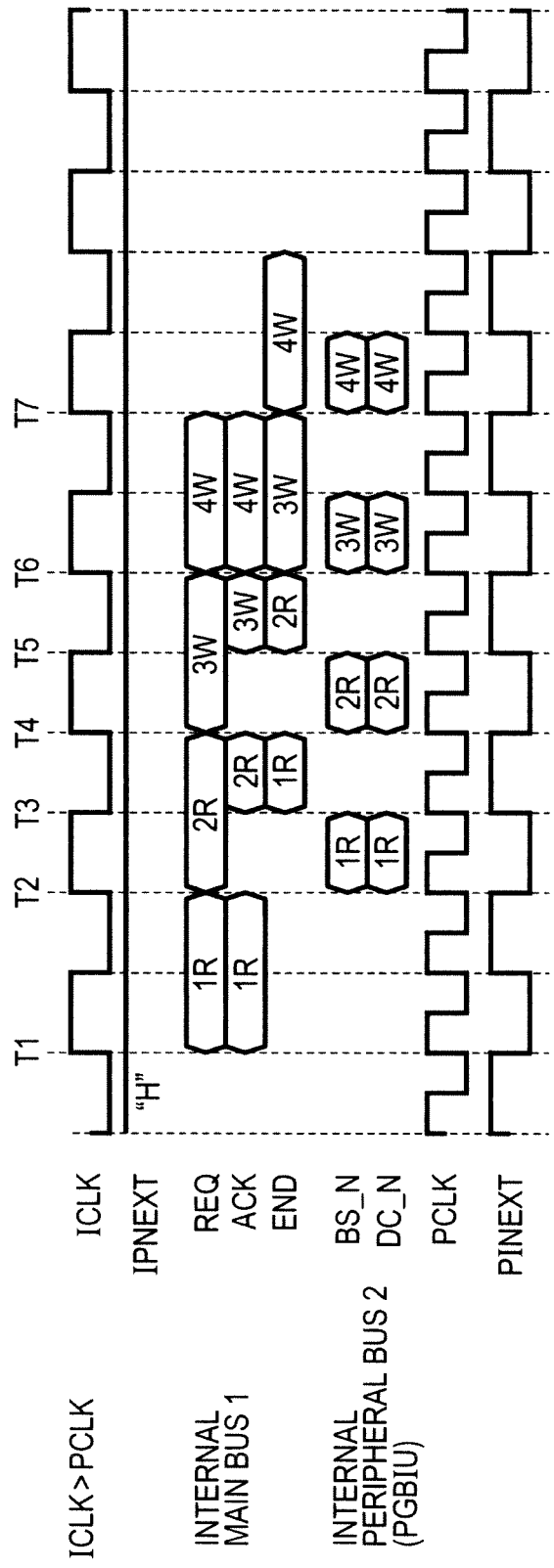
FIG. 5 is a timing diagram illustrating an operation that is performed by the microcomputer when an ICLK frequency is lower than a PCLK frequency.

FIG. 5 is a timing diagram illustrating an operation that is performed by the microcomputer when the frequency of the ICLK is lower than the frequency of the PCLK. First of all, when, at time T1, the CPU 1 outputs a REQ signal for a first read access (1R) to internal main bus 1, the PGBIU 83 returns an ACK signal to the CPU 1.

At time T2, the PGBIU 83 receives a REQ from the CPU 1 at the next cycle at which the PINEXT signal is at the H level, and outputs a bus access start (BS_N) signal to internal peripheral bus 2 (timer 3). At this time, the PGBIU 83 receives a bus access end (DC_N) signal from internal peripheral bus 2. Further, the CPU 1 outputs a REQ signal for a second read access (2R) to internal main bus 1.

At time T3, the PGBIU 83 outputs an END signal (1R) to the CPU 1 and returns an ACK signal for the second read access (2R) to the CPU 1.

At time T4, the CPU 1 outputs a REQ signal for a third write access (3W) to internal main bus 1. Further, the PGBIU 83 receives a REQ (2R) from the CPU 1 at the next cycle at which the PINEXT signal is at the H level, and outputs a BS_N signal to internal peripheral bus 2. At this time, the PGBIU 83 receives a DC_N signal from internal peripheral bus 2.

At time T5, the PGBIU 83 outputs an END signal (2R) to the CPU 1 and returns an ACK signal for the third write access (3W) to the CPU 1.

At time T6, the CPU 1 outputs a REQ signal for a fourth write access (4W) to internal main bus 1. Further, the PGBIU 83 outputs an END signal (3W) at the next cycle at which the PINEXT signal is at the H level, and returns an ACK signal for the fourth write access (4W) to the CPU 1. Moreover, the PGBIU 83 receives a REQ (3W) from the CPU 1 at the next cycle at which the PINEXT signal is at the H level, and outputs a BS_N signal to internal peripheral bus 2. At this time, the PGBIU 83 receives a DC_N signal from internal peripheral bus 2.

As described above, when the frequency of the ICLK (clock 1) is lower than the frequency of the PCLK (clock 2), the PGBIU 83 uses the frequency conversion logic circuit 11 shown in FIG. 2 to generate the ACK signal and END signal at the next cycle at which the PINEXT signal is at the H level.

As described above, when the frequency of clock 1 is higher than the frequency of clock 2, the microcomputer according to the present embodiment generates a bus control signal for an internal peripheral bus in accordance with synchronization signal 1. When, on the other hand, the frequency of clock 1 is lower than the frequency of clock 2, the microcomputer generates a bus control signal for an internal main bus in accordance with synchronization signal 2. Therefore, bus access can be gained irrespective of the magnitude relationship between the frequency of a CPU and the frequency of a peripheral I/O device. This makes it possible to eliminate constraints imposed by the magnitude relationship between relevant frequencies, and reduce the power consumption of the CPU while keeping the clocks of peripheral I/O devices constant.

Further, in marked contrast to a sleep mode in which a CPU clock is stopped, the present embodiment makes it possible to reduce the overall power consumption of the microcomputer while allowing the CPU to perform bus processing such as peripheral I/O register polling.

Furthermore, even when a DMAC is used as a bus master, the present embodiment makes it possible to reduce the overall power consumption of the microcomputer while making a data transfer with the clock frequency of the DMAC lowered in a situation where speed of transfer is not essential.

Second Embodiment

Figure 6:
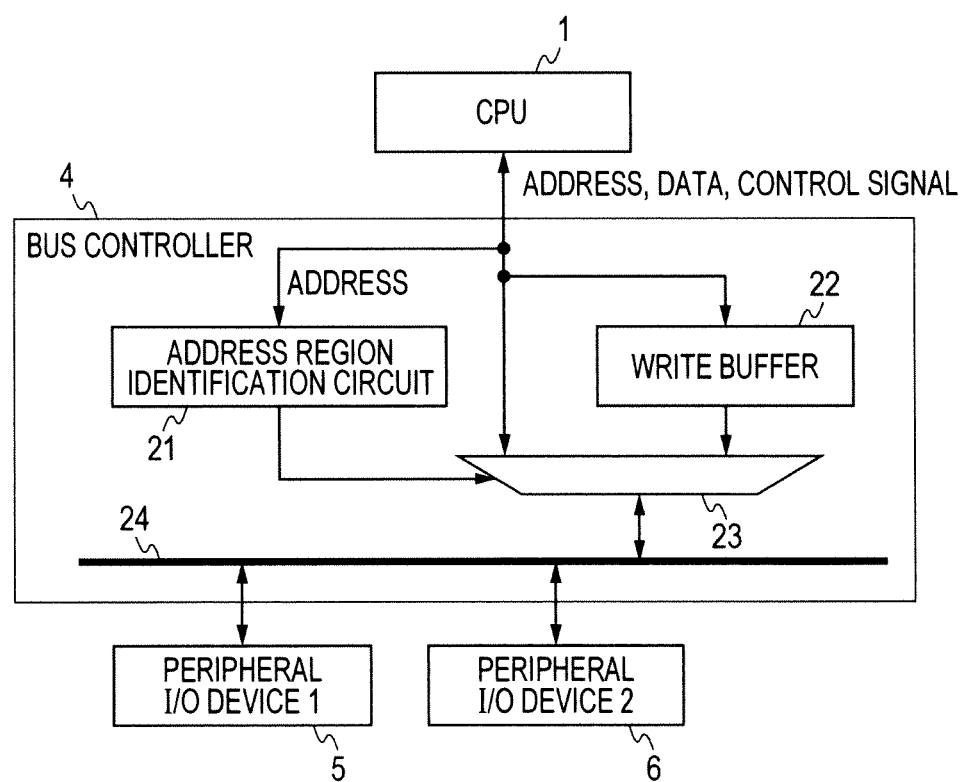
FIG. 6 is a block diagram illustrating a schematic configuration of the microcomputer according to a second embodiment of the present invention.

FIG. 6 is a block diagram illustrating a schematic configuration of the microcomputer according to a second embodiment of the present invention. The microcomputer shown in FIG. 6 includes a CPU 1, a bus controller 4, peripheral I/O device 1 (5), and peripheral I/O device 2 (6).

The bus controller 4 includes an address region identification circuit 21, a write buffer 22, and a selector 23. The selector 23 is coupled to peripheral I/O device 1 (5) and peripheral I/O device 2 (6) through an internal bus 24. The following description assumes that peripheral I/O device 1 (5) is coupled to internal peripheral bus 1 (PIBIU 82), which is shown in FIG. 3, and that peripheral I/O device 2 (6) is coupled to internal peripheral bus 2 (PGBIU 83), which is also shown in FIG. 3.

When gaining write access to peripheral I/O device 1 (5) or peripheral I/O device 2 (6), the CPU 1 writes relevant write data and access property information (an upper address, the size of the write data, and the byte position of the write data) in the write buffer 22.

When, for instance, the CPU 1 gains write access to peripheral I/O device 1 (5), and then gains the next access to the same access destination, that is, peripheral I/O device 1 (5), the write buffer 22 notifies the CPU 1 of the end of access and accepts the next access at the moment at which the write data and access property information concerning the current access are written into the write buffer 22.

If, on the other hand, the destination of the next access is peripheral I/O device 2 (6), which is a destination different from the destination of the current access, the write buffer 22 waits until it receives an end notification from peripheral I/O device 1 (5), which is the destination of the current access, then notifies the CPU 1 of the end of access, and accepts the next access.

The address region identification circuit 21 determines, in accordance with an upper address output from the CPU 1, what internal peripheral bus is to be accessed. For example, internal peripheral buses 1 to 6, which are shown in FIG. 3, are mapped to different address regions. What internal peripheral bus is to be accessed can be determined by referencing the upper address output from the CPU 1.

When peripheral I/O device 1 (5) or peripheral I/O device 2 (6) needs to be accessed through the write buffer 22, the address region identification circuit 21 causes the selector 23 to select and output an output signal of the write buffer 22. When, on the other hand, peripheral I/O device 1 (5) or peripheral I/O device 2 (6) is to be accessed but need not be accessed through the write buffer 22, the address region identification circuit 21 causes the selector 23 to select and output an output signal of the CPU 1.

Figure 7:
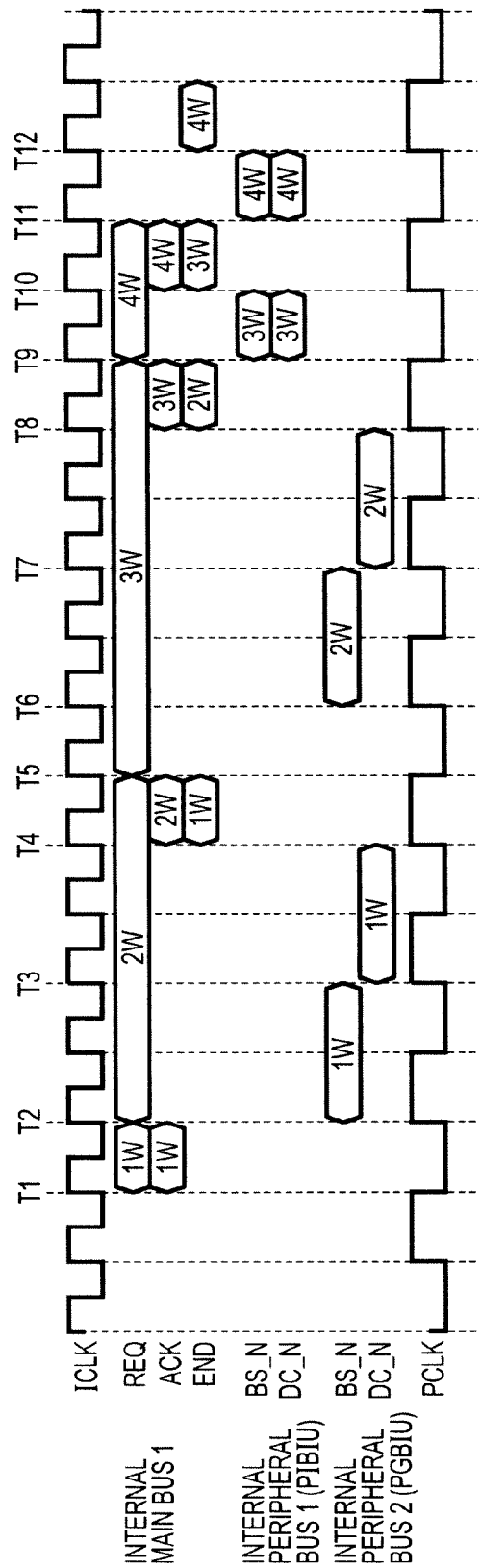
FIG. 7 is a timing diagram illustrating an operation that is performed without using a write buffer 22 of the microcomputer according to the second embodiment of the present invention.

FIG. 7 is a timing diagram illustrating an operation that is performed without using the write buffer 22 of the microcomputer according to the second embodiment of the present invention. The timing diagram shown in FIG. 7 assumes that the CPU 1 accesses a peripheral I/O device coupled to internal peripheral bus 1 or 2 through the PIBIU 82 or the PGBIU 83. The symbols "1W" and "2W" represent write cycles relative to internal peripheral bus 2, whereas the symbols "3W" and "4W" represent write cycles relative to internal peripheral bus 1.

First of all, when, at time T1, the CPU 1 outputs a bus access request (REQ) for a first write access (1W) to internal main bus 1, the PGBIU 83 returns a bus access acknowledgment (ACK) signal to the CPU 1.

At time T2, the PGBIU 83 receives a REQ from the CPU 1 and outputs a bus access start (BS_N) signal to internal peripheral bus 2. Further, the CPU 1 outputs a REQ signal for a second write access (2W) to internal main bus 1.

At time T3, the PGBIU 83 receives a bus access end (DC_N) signal from internal peripheral bus 2.

At time T4, the PGBIU 83 outputs a bus access end (END) signal to the CPU 1 and returns an ACK signal for the second write access (2W) to the CPU 1.

At time T5, the CPU 1 outputs a REQ signal for a third write access (3W) to internal main bus 1.

At time T6, the PGBIU 83 receives a REQ (2W) from the CPU 1 and outputs a BS_N signal to internal peripheral bus 2. At time T7, the PGBIU 83 receives a DC_N signal from internal peripheral bus 2.

At time T8, the PGBIU 83 outputs an END signal (2W) to the CPU 1. Further, the PIBIU 82 returns an ACK signal for the third write access (3W) to the CPU 1.

At time T9, the PIBIU 82 receives a REQ (3W) from the CPU 1 and outputs a BS_N signal to internal peripheral bus 1. Further, the PIBIU 82 receives a DC_N signal from internal peripheral bus 1. At this time, the CPU 1 outputs a REQ signal for a fourth write access (4W) to internal main bus 1.

At time T10, the PIBIU 82 outputs an END signal (3W) to the CPU 1 and returns an ACK signal for the fourth write access (4W) to the CPU 1.

Figure 8:
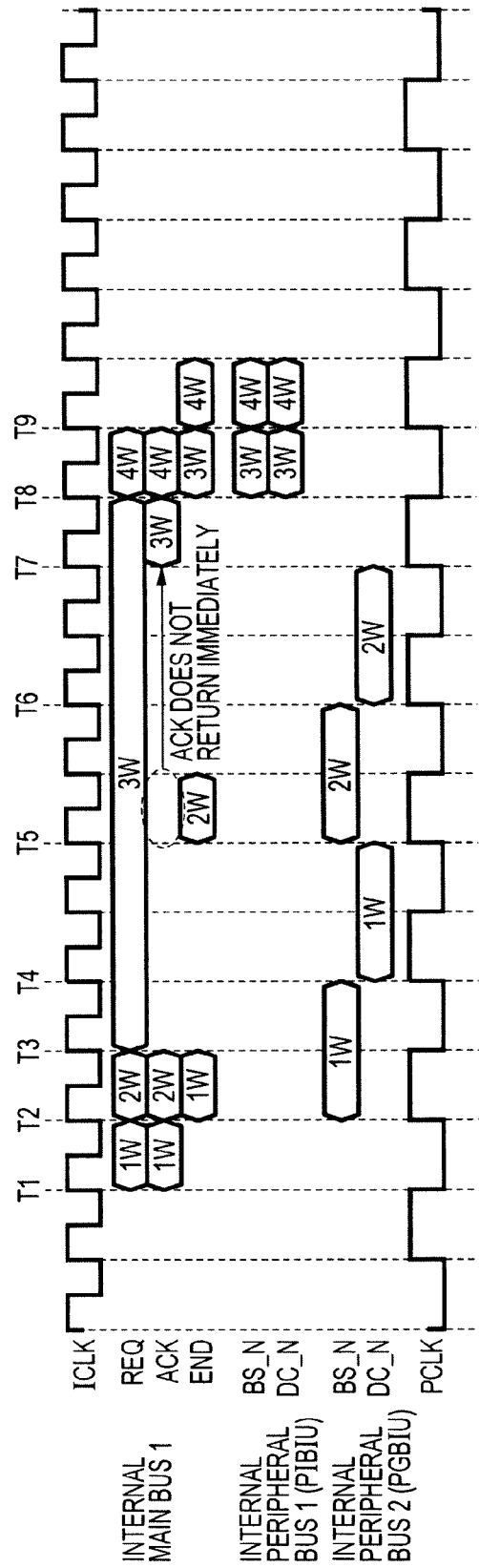
FIG. 8 is a timing diagram illustrating an operation that is performed by using the write buffer 22 of the microcomputer according to the second embodiment of the present invention.

FIG. 8 is a timing diagram illustrating an operation that is performed by using the write buffer 22 of the microcomputer according to the second embodiment of the present invention. As is the case with FIG. 7, the symbols "1W" and "2W" represent write cycles relative to internal peripheral bus 2, whereas the symbols "3W" and "4W" represent write cycles relative to internal peripheral bus 1.

First of all, when, at time T1, the CPU 1 outputs a bus access request (REQ) for a first write access (1W) to internal main bus 1, the PGBIU 83 returns a bus access acknowledgment (ACK) signal to the CPU 1.

At time T2, the PGBIU 83 receives a REQ from the CPU 1, outputs a bus access start (BS_N) signal to internal peripheral bus 2, and outputs a bus access end (END) signal to the CPU 1. Further, when the CPU 1 outputs a REQ signal for a second write access (2W) to internal main bus 1, the PGBIU 83 returns an ACK signal (2W) to the CPU 1.

At time T3, the CPU 1 outputs a REQ signal for a third write access (3W) to internal main bus 1. At time T4, the PGBIU 83 receives a bus access end (DC_N) signal from internal peripheral bus 2.

At time T5, the PGBIU 83 receives a REQ (2W) from the CPU 1, outputs a BS_N signal to internal peripheral bus 2, and outputs an END signal (2W) to the CPU 1. At this time, the PIBIU 82 does not return an ACK signal to the CPU 1, but puts the CPU 1 on standby because the write cycle (3W) is for internal peripheral bus 1.

At time T6, the PGBIU 83 receives a DC_N signal from internal peripheral bus 2. At time T7, the PIBIU 82 recognizes that the write access (2W) by the PGBIU 83 is terminated, and returns an ACK signal (3W) to the CPU 1.

At time T8, the PIBIU 82 receives a REQ (3W) from the CPU 1, outputs a BS_N signal to internal peripheral bus 1, and outputs an END signal (3W) to the CPU 1. Further, when the CPU 1 outputs a REQ signal for a fourth write access (4W) to internal main bus 1, the PIBIU 82 returns an ACK signal (4W) to the CPU 1.

As described above, when the CPU 1 gains write access to peripheral I/O device 1, and then gains the next access to peripheral I/O device 2, which is a destination different from the destination of the current access, the write buffer waits until it receives an end notification from peripheral I/O device 1, which is the destination of the current access, then notifies the CPU 1 of the end of access, and accepts the next access. This guarantees the access order of the peripheral I/O devices coupled to different internal peripheral buses.

Third Embodiment

Figure 9:
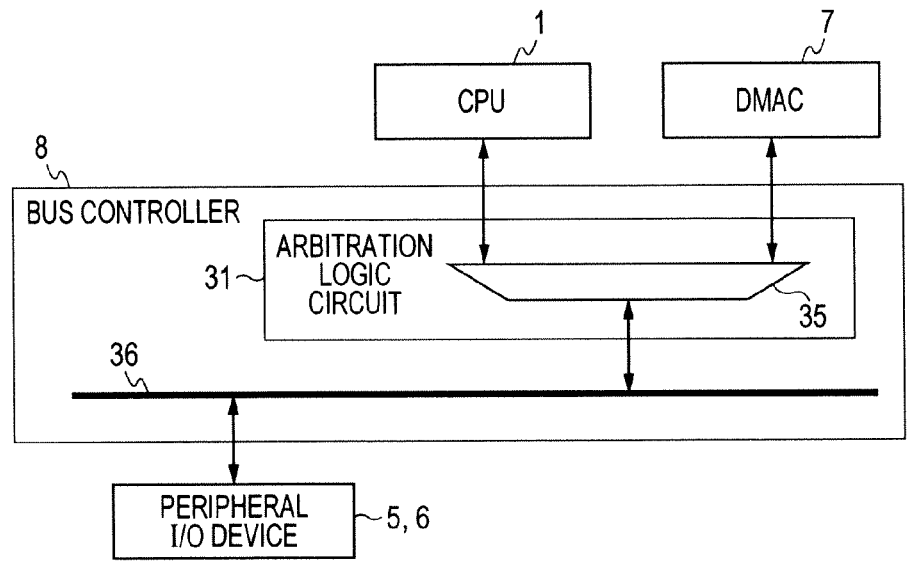
FIG. 9 is a block diagram illustrating a schematic configuration of the microcomputer according to a third embodiment of the present invention.

FIG. 9 is a block diagram illustrating a schematic configuration of the microcomputer according to a third embodiment of the present invention. The microcomputer shown in FIG. 9 includes a CPU 1, peripheral I/O devices 5, 6, a DMAC 7, and a bus controller 8.

The bus controller 8 includes an arbitration logic circuit 31, which is coupled to the CPU 1 and the DMAC 7 and coupled to the peripheral I/O devices 5, 6 through a bus 36. The arbitration logic circuit 31 generally arbitrates accesses in accordance with a predetermined order of priority while the DMAC 7 is given higher priority than the CPU 1. However, if an interrupt, I/O register setup, or other similar event occurs, the arbitration logic circuit 31 arbitrates accesses in accordance with a predetermined order of priority while the CPU 1 is given higher priority than the DMAC 7. The arbitration logic circuit 31 may perform arbitration in accordance with a predetermined order of priority or in round-robin fashion.

Figure 10:
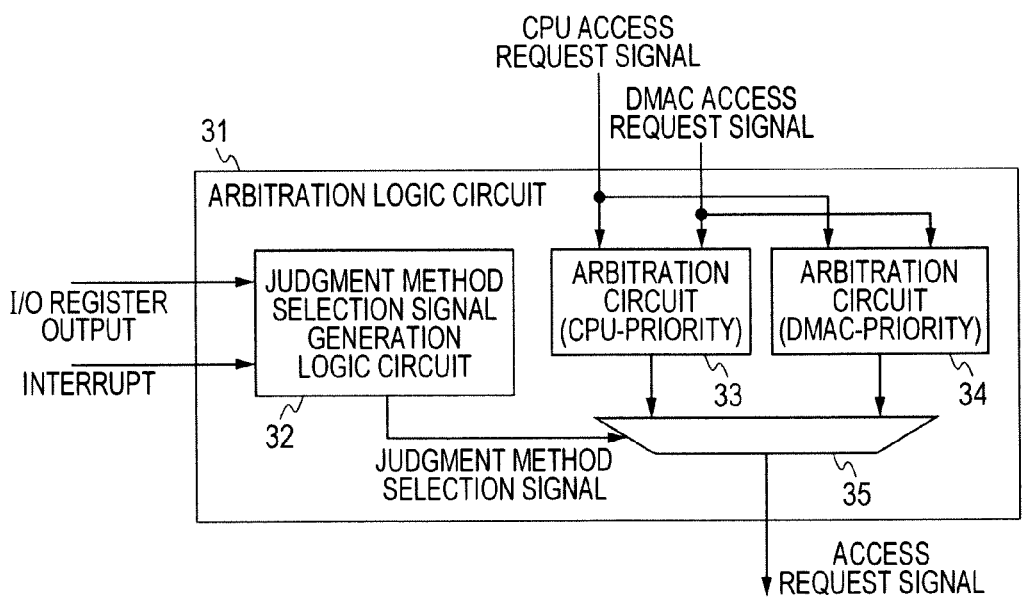
FIG. 10 is a diagram illustrating in detail an arbitration logic circuit 31 shown in FIG. 9.

FIG. 10 is a diagram illustrating in detail the arbitration logic circuit 31 shown in FIG. 9. The arbitration logic circuit 31 includes a judgment method selection signal generation logic circuit 32, a CPU-priority arbitration circuit 33, a DMAC-priority arbitration circuit 34, and a selector 35.

The arbitration circuit 33 arbitrates accesses while the CPU 1 is given higher priority than the DMAC 7. The arbitration circuit 34 arbitrates accesses while the DMAC 7 is given higher priority than the CPU 1.

In a normal operating state, the judgment method selection signal generation logic circuit 32 outputs a judgment method selection signal so as to cause the selector 35 to select an access request signal output from the arbitration circuit (DMAC-priority) 34 for the purpose of giving the DMAC 7 higher priority than the CPU 1.

Upon detection of an I/O register output or interrupt, the judgment method selection signal generation logic circuit 32 outputs a judgment method selection signal to the selector 35 so as to cause the selector 35 to select an access request signal output from the arbitration circuit (CPU-priority) 33 for the purpose of giving the CPU 1 higher priority than the DMAC 7.

The CPU 1 can be preset to detect the end of an I/O register output process or interrupt process so that the judgment method selection signal generation logic circuit 32 reverts to the DMAC-priority state at the end of the I/O register output process or interrupt process.

Figure 11A:
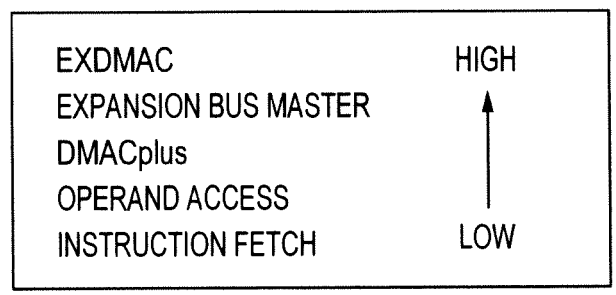
FIGS. 11A and 11B are diagrams illustrating examples of arbitrations conducted by the arbitration logic circuit 31.
Figure 11B:
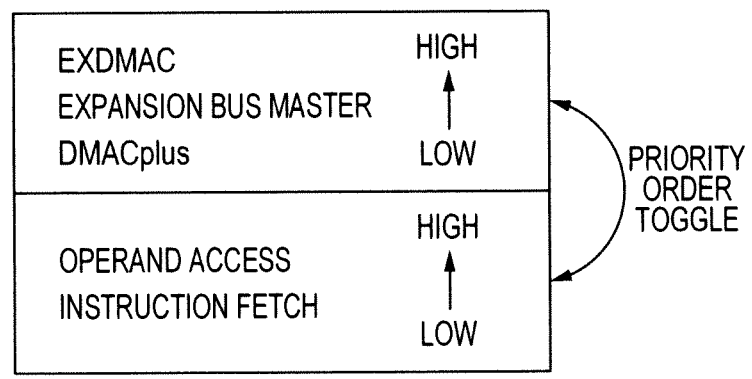

FIGS. 11A and 11B are diagrams illustrating examples of arbitrations conducted by the arbitration logic circuit 31. The judgment method selection signal generation logic circuit 32 has a priority order toggle function in addition to the above-described arbitration method. FIG. 11A shows the order of bus access priority that prevails when the priority order toggle function is off. The EXDMAC is given the highest priority. In order from highest priority to lowest priority, bus accesses are: EXDMAC, expansion bus master, DMAC plus, operand access, instruction fetch. This priority order is fixed and set in the arbitration circuit (DMAC-priority) 34.

When the priority order toggle function is off, the judgment method selection signal generation logic circuit 32 outputs a judgment method selection signal to the selector 35 so as to cause the selector 35 to select an access request signal output from the arbitration circuit (DMAC-priority) 34.

FIG. 11B shows the order of bus access priority that prevails when the priority order toggle function is on. As indicated in the upper half of FIG. 11B, the EXDMAC is given the highest priority. In order from highest priority to lowest priority, bus accesses are: EXDMAC, expansion bus master, DMAC plus. This priority order is set in the arbitration circuit (DMAC-priority) 34.

Further, another priority order is indicated in the lower half of FIG. 11B. In order from highest priority to lowest priority, bus accesses are: operand access, instruction fetch. This priority order is set in the arbitration circuit (CPU-priority) 33.

After an access request signal from the CPU 1 is accepted, for example, the judgment method selection signal generation logic circuit 32 outputs a judgment method selection signal to the selector 35 so as to cause the selector 35 to select an access request signal output from the arbitration circuit (DMAC-priority) 34. On the contrary, after an access request signal from the DMAC 7 is accepted, the judgment method selection signal generation logic circuit 32 outputs a judgment method selection signal to the selector 35 so as to cause the selector 35 to select an access request signal output from the arbitration circuit (CPU-priority) 33. In the manner described above, the priority order toggle function is implemented by causing the selector 35 to sequentially select an access request signal output from the arbitration circuit (CPU-priority) 33 or the arbitration circuit (DMAC-priority) 34.

As described above, when an I/O register output or interrupt is detected, the microcomputer according to the present embodiment causes the arbitration logic circuit 31 to give the CPU 1 higher priority than the DMAC 7. Therefore, an interrupt process, an I/O register output process, or other process requiring immediate attention can be preferentially performed. In other words, flexible bus arbitration can be performed in accordance with the circumstances.

Fourth Embodiment

Figure 12:
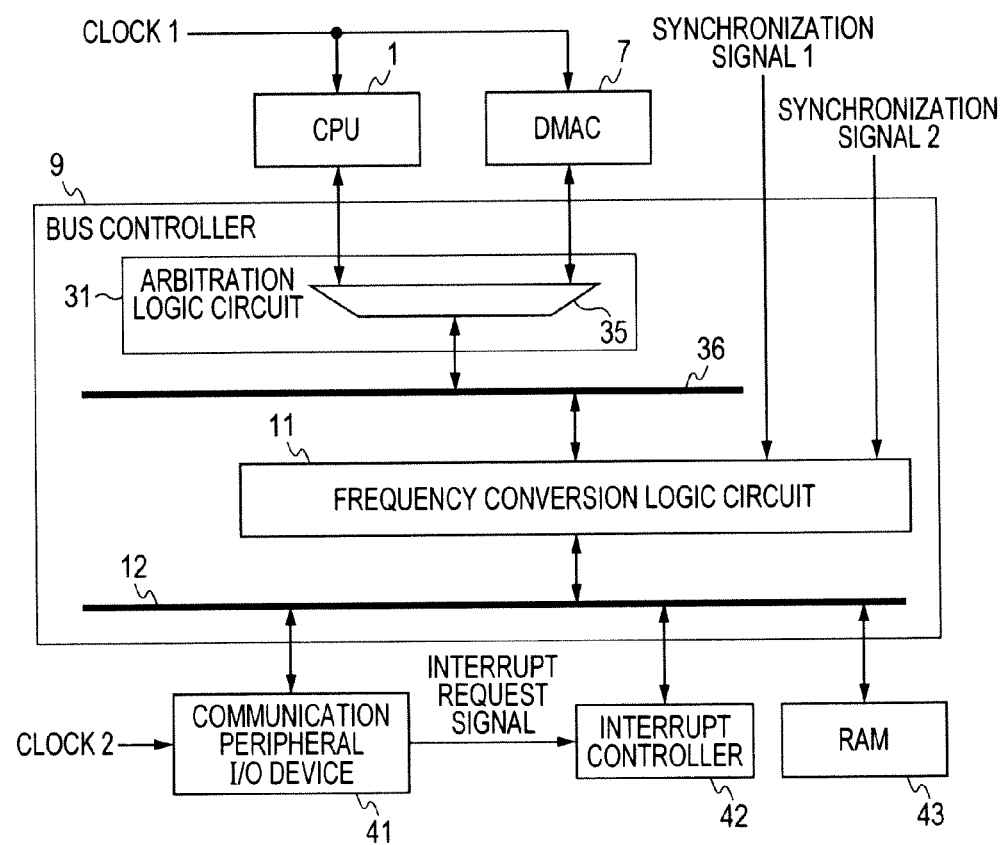
FIG. 12 is a block diagram illustrating a schematic configuration of the microcomputer according to a fourth embodiment of the present invention.

FIG. 12 is a block diagram illustrating a schematic configuration of the microcomputer according to a fourth embodiment of the present invention. The microcomputer shown in FIG. 12 includes a CPU 1, a DMAC 7, a bus controller 9, a communication peripheral I/O device 41, an interrupt controller 42, and a RAM 43.

The bus controller 9 includes an arbitration logic circuit 31 and a frequency conversion logic circuit 11. The arbitration logic circuit 31 is coupled to the CPU 1 and the DMAC 7 and coupled to the frequency conversion logic circuit 11 through a bus 36. The frequency conversion logic circuit 11 is coupled to the communication peripheral I/O device 41, the interrupt controller 42, and the RAM 43 through a bus 12.

The frequency conversion logic circuit 11 is identical with the corresponding circuit 11 included in the microcomputer according to the first embodiment, which is shown in FIG. 1. The arbitration logic circuit 31 is identical with the corresponding circuit 31 included in the microcomputer according to the third embodiment, which is shown in FIG. 3. Therefore, the similar configurations and functions will not be redundantly described in detail.

The communication peripheral I/O device 41 performs a high-speed operation in accordance with clock 2. The DMAC 7 performs DMA transfer between the communication peripheral I/O device 41 and the RAM 43. While the CPU 1 remains on standby until the end of such DMA transfer, the power consumption can be reduced by lowering the frequency of clock 1, which is supplied to the CPU 1. In this instance, the frequency conversion logic circuit 11 subjects a bus control signal to frequency conversion as described in connection with the first embodiment.

Further, the efficiency of bus operations can be enhanced by allowing the arbitration logic circuit 31 to give the DMAC 7 higher priority than the CPU 1.

When the DMAC 7 transfers a certain amount of data to the RAM 43, the frequency of clock 1, which is supplied to the CPU 1, is increased. When, in this instance, the arbitration logic circuit 31 gives the CPU 1 higher priority than the DMAC 7, the CPU 1 can access the RAM 43 rapidly and efficiently.

As described above, the bus controller 9 included in the microcomputer according to the present embodiment is configured so that the frequency conversion logic circuit 11 is coupled to the arbitration logic circuit 31. Therefore, the present embodiment provides the above-described advantage in addition to the advantages provided by the first and third embodiments.

Fifth Embodiment

Figure 13:
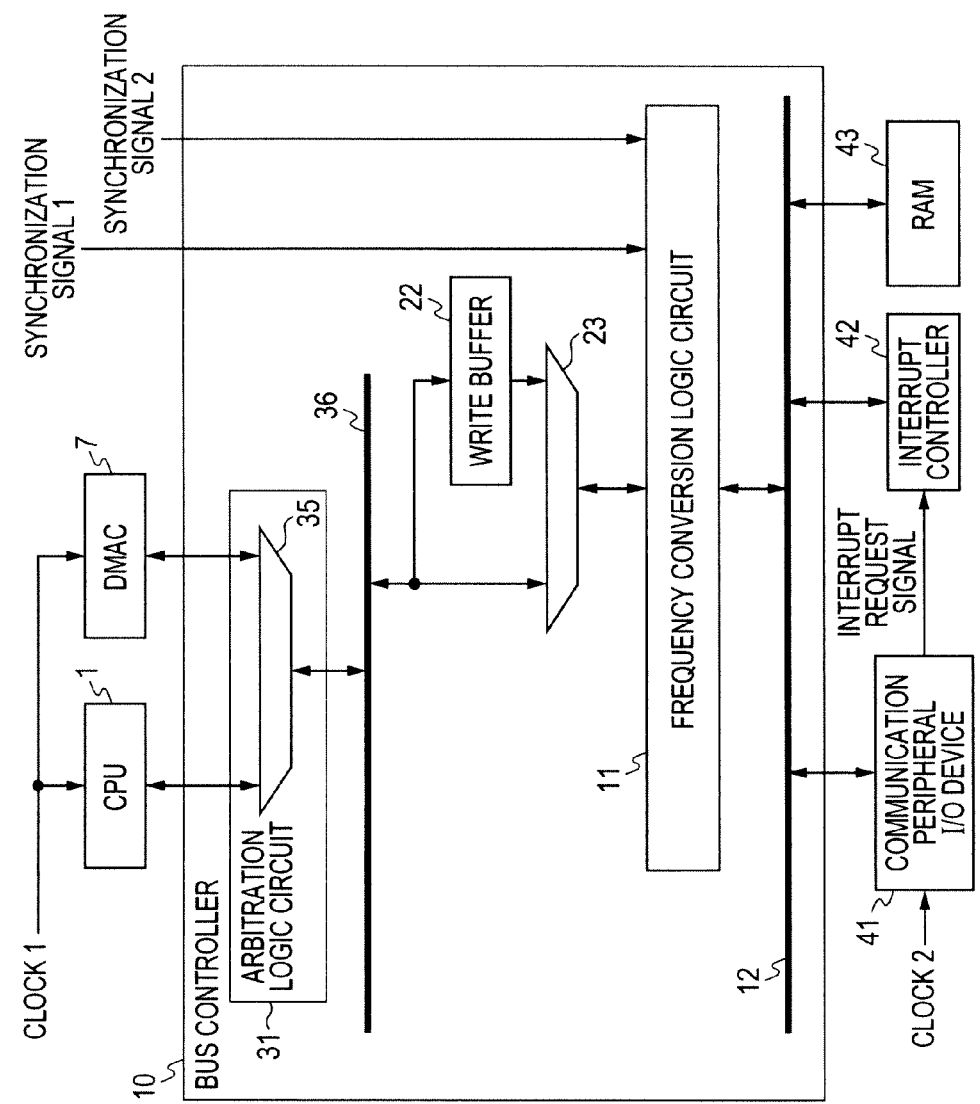
FIG. 13 is a block diagram illustrating a schematic configuration of the microcomputer according to a fifth embodiment of the present invention.

FIG. 13 is a block diagram illustrating a schematic configuration of the microcomputer according to a fifth embodiment of the present invention. The microcomputer shown in FIG. 13 is similar to the microcomputer according to the fourth embodiment, which is shown in FIG. 12, except that the write buffer 22 and the selector 23, which are described in connection with the second embodiment, are inserted between the bus 36 and the frequency conversion logic circuit 11. Therefore, the similar configurations and functions will not be redundantly described in detail.

The use of the configuration shown in FIG. 13 not only guarantees the order of write operations during internal register setup for the communication peripheral I/O device 41 and the interrupt controller 42, which operate in conjunction with each other, but also enhances the performance of continuous write access of the CPU 1 to the RAM 43.

As described above, the microcomputer according to the present embodiment is obtained by adding the write buffer 22 and the selector 23 to the microcomputer according to the fourth embodiment. Therefore, the present embodiment provides the above-described advantage in addition to the advantage provided by the fourth embodiment.

The presently preferred embodiments are considered in all respects to be illustrative, and not restrictive. The scope of the present invention is indicated by the appended claims, rather than the foregoing description, and all changes that come within the meaning and range of equivalence thereof are intended to be embraced therein.

What is claimed is:

1. A microcomputer comprising:
 a bus master that operates in accordance with a first clock having a variable frequency;
 a bus slave that operates in accordance with a second clock; and
 a bus controller that is coupled to the bus master through a main bus and coupled to the bus slave through a peripheral bus,
 wherein, when the first clock and the second clock are provided simultaneously for the bus master and the bus slave, respectively, and the frequency of the first clock is higher than the frequency of the second clock, the bus controller generates a bus control signal for the bus slave by using a first synchronization signal, which indicates the change timing of a bus control signal for the peripheral bus, and
 wherein, when the first clock and the second clock are provided simultaneously for the bus master and the bus slave, respectively, and the frequency of the first clock is lower than the frequency of the second clock, the bus controller generates a bus control signal for the bus master by using a second synchronization signal, which indicates the change timing of a bus control signal for the main bus.

2. The microcomputer according to claim 1, further comprising:
 an arbitrator,
 wherein the bus master includes a first bus master and a second bus master,
 wherein the arbitrator arbitrates accesses from the first bus master and the second bus master, and
 wherein, if an interrupt or an I/O register setup occurs even in a situation where access from the first bus master is given priority during arbitration, the arbitrator gives priority to access from the second bus master.

3. The microcomputer according to claim 1, further comprising:
 a write buffer that performs write access from the bus master,
 wherein the bus slave includes a first bus slave, which is coupled to a first peripheral bus, and a second bus slave, which is coupled to a second peripheral bus, and
 wherein, when the bus master performs write access to the first bus slave and then performs the next access to the second bus slave, the write buffer accepts the next access from the bus master after an end notification concerning the write access is received from the first bus slave.

4. The microcomputer according to claim 1, wherein the bus control outputs the bus control signal for the bus slave in synchronism with the first clock, and outputs the bus control signal for the bus master in synchronism with the second clock.

* * * * *